Dec. 7, 1943.   A. D. BLAND ET AL   2,335,993
POULTRY ELECTROCUTIONER
Filed July 12, 1940
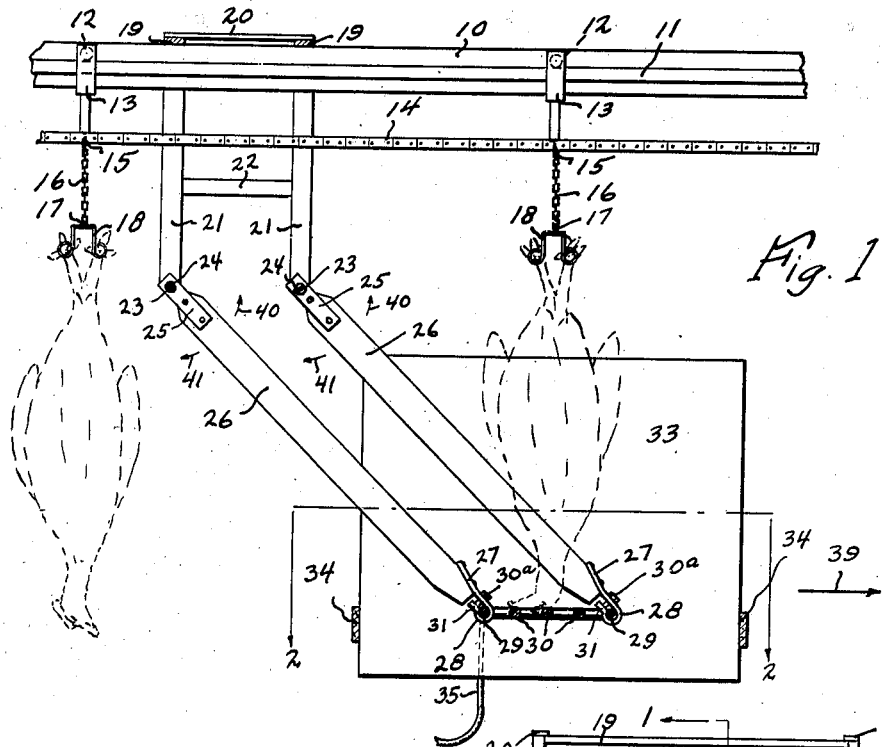
Fig. 1
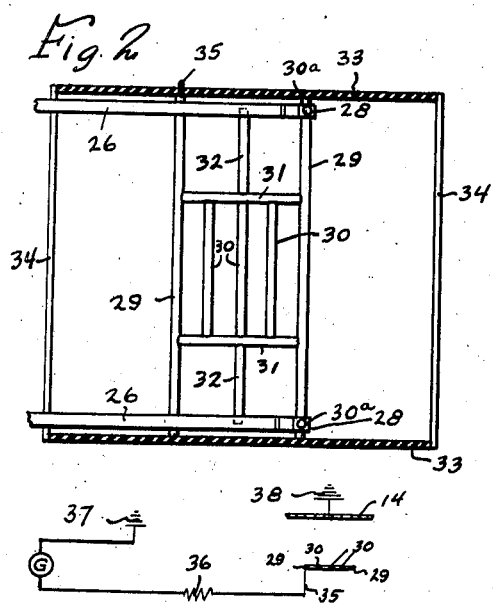
Fig. 2
Fig. 4
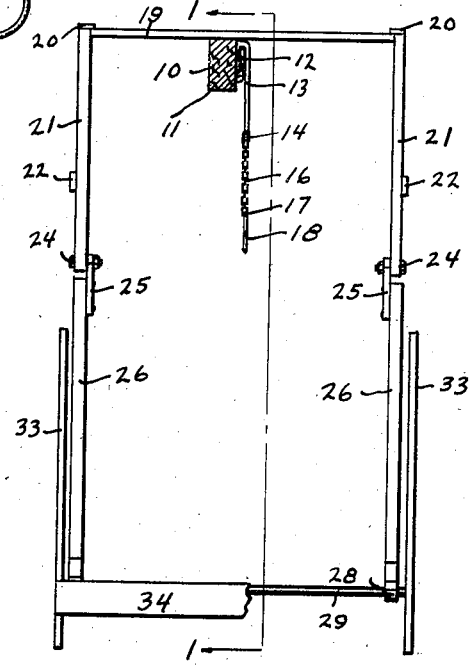
Fig. 3
INVENTORS
Abraham D. Bland
Glen F. Hendershelt
BY
Sam J. Slotsky
ATTORNEY.

Patented Dec. 7, 1943

2,335,993

UNITED STATES PATENT OFFICE 2,335,993

POULTRY ELECTROCUTIONER

Abraham D. Bland and Glen F. Houdersheldt, Sioux City, Iowa

Application July 12, 1940, Serial No. 345,166

2 Claims. (Cl. 17—11)

Our invention pertains to a device for electrocuting poultry or any type of fowl.

An object of our invention is to provide a device for stunning the animal by electrical means immediately following the sticking operation.

A further object of our invention is to provide a device which provides means for directing the electrocuting voltage through the creature from the head or neck portion to the feet, and to provide such an arrangement which will provide an electrical contact at the wet or bloody portions of the fowl so that the maximum current will flow.

A further object of our invention is to provide a simple and compact structure which can be readily attached to a chain conveyor system.

A further object of our invention is to provide a contact grid of such formation so that a positive contact is insured.

A further object of our invention is to provide a special adjusting arrangement which will allow adjustment of the contact grid to any desired level to accommodate different sized fowl.

A further object of our invention is to provide a barrier structure having insulating features to prevent contact of any of the electrical portions by the operator.

With these and other objects in view, our invention consists in the construction, arrangement, and combination of the various parts of our device, whereby the objects contemplated are attained, as hereinafter more fully set forth, pointed out in our claims, and illustrated in the accompanying drawing, in which:

Figure 1 is a side elevation of the arrangement and taken in section substantially along the lines 1—1 of Figure 3, Figure 2 is a sectional view taken approximately along the lines 2—2 of Figure 1, Figure 3 is a view taken rearwardly of the device or from the entering position, and Figure 4 is a schematic diagram of the electrical connections.

Our invention contemplates principally the provision of means for electrocuting or shocking the fowl by an electric current just after the fowl is stuck in the throat or mouth for the bleeding thereof. When the fowl is bled, or immediately after sticking, it will actively flap its wings and writhe about, thereby causing a certain amount of injury to the flesh in the wings and other portions and for other obvious reasons, resulting in an inferior carcass. Our invention, however, eliminates this objectionable feature since, immediately after the sticking operation, the fowl is brought in contact with the voltage which is sufficient to stun or shock the fowl so that it immediately is rendered quiet and inactive. This, then, results in no injury to the carcass portions.

We have used the character 10 to designate a ceiling mounted beam upon which is attached the track 11 which track is engaged with suitable pulley members 12 enclosing which are the frames 13 which frames 13 are, in turn, attached to the travelling chain 14. Attached at 15 to the chain 14 are the downwardly depending chains 16 which are attached at 17 to the hooks or feet engaging members 18 which are adapted to engage the feet of the poultry. Attached across the member 10 are the supporting beams 19 which include the braces 20 attached thereto, and attached to the cross beams 19 are the vertical downwardly extending members 21 of which there are a pair on either side and which are further braced by suitable braces 22. Attached at the lower ends of the members 21 at 23 are the bolts and nuts 24 which are fairly tightly engaged with the straps 25 which straps are attached to the parallel wooden beams 26. The beams 26 can be made of wood or any other suitable insulating material, and are attached to the strap members 27 which strap members are fairly tightly engaged at 28 with the transverse bars 29. A bolt 30a is threadably engaged at 31 with the strap portion so that the frictional engagement can be made as tight as desired at this point.

The bars 29 form the ends of an electric contact grid which grid is further made up of the further shortened bars 30, the bars 31, and the extending bars 32, the entire system of bars being attached to each other as shown. Attached to the bars 29 are the insulating barriers 33 which substantially cover the sides of the grid, and attached across the members 33 are the further protecting members 34 to prevent the operator from getting in too close to the grid. The grid is electrically connected by means of the lead 35 which lead passes to a suitable resistance 36 which, in turn, is connected into a 110-volt circuit, the resistance serving to diminish the voltage to a certain degree when the current is flowing. The 110-volt circuit is attached to ground in the usual manner at 37 as shown in Figure 4, and the chain 14 is, of course, attached to ground at 38. Any desired voltage source of any potentiality can be employed instead of 110 volts, if such is desired.

The device is used in the following manner. The feet of the fowl are attached to the hooks 18 in the usual manner in the line, and as the fowl reaches the approximate position shown at the left hand of Figure 1, it is then stuck through the mouth or in any other suitable manner causing it to bleed freely. Normally, the creature will then start to writhe about and flap its wings, etc., but since the chain is travelling in the direction of the arrow 39, the bloody portions of the fowl or the neck and head portions will contact against the left-hand bar 29 and the current will then flow through the bloody portions, which are rendered of low resistance since they are moistened, and the current will flow through the body of the creature to the chain or ground, thereby immediately quietening the bird so that it cannot flap about and injure the carcass portions. It should be specifically noted that the height of the grid formed by the aforesaid bars 29, 30, 31, and 32 is above the lower points of the creature's head so that, as it travels across the grid, the head will be brought up into the approximate position as shown in Figure 1 and will drag across the successive cross bars 30 to insure that the shock or voltage is applied a few times to complete the stunning process. The bird then continues to travel in a still bleeding condition into the various other processes.

The side partitions 33 prevent the operator from getting in contact with the grid as well as the transverse insulating bars 34. The height of the grid can be readily adjusted for different sized fowl by simply holding the partitions 33 at any point and then pushing upwardly or downwardly which will cause the bars 26 to pivot either in the direction of the arrows 40 or 41, and since the frictional engagement at the points 23 and 28 are substantially solid, the grid arrangement will remain at any fixed position and will in all cases, due to the parallelogram formed by the bars 26 and the grid, be also truly horizontal at any fixed elevation. This, then, provides an adjustable arrangement for accommodating smaller or larger fowl. The extending bars 32 of the grid insure that the contact is made during any possible lateral movement of the bird. The bolts 24 and 30a can be tightened as desired to fix the device to rigid position, although this is only necessary at comparatively long intervals, and during adjustment the frictional engagement of the members will secure the device firmly after the simple adjusting operation.

It will now be seen that we have provided apparatus for electrocuting fowl which includes the advantages above mentioned as well as further other advantages.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

1. A poultry electrocutioning device comprising a contact grid, said grid including a plurality of parallel transverse bars to provide positive contact during the passage of a fowl thereover, a chain member, means for supporting a plurality of fowl from said chain member, said chain member being adapted to pass over said grid so that the head and neck portions of the fowl will contact the same, said grid having provision for connection with one of the two terminals of a source of electric voltage, said chain having provision for connection through a ground with the other of said terminals to thereby provide passage of an electric current through said fowl upon contact with the grid.

2. A poultry electrocutioning device comprising a contact grid, said grid including a plurality of parallel transverse bars to provide positive contact during the passage of a fowl thereover, a chain member, means for supporting a plurality of fowl from said chain member, said chain member being adapted to pass over said grid so that the head and neck portions of the fowl will contact the same, said grid having provision for connection with one of the two terminals of a source of electric voltage, said chain having provision for connection through a ground with the other of said terminals to thereby provide passage of an electric current through said fowl upon contact with the grid, means for adjusting said grid to desired heights, including a pair of insulating supporting members pivotally secured to said grid at opposite sides thereof and the extremities of said grid, means for pivoting the upper ends of said insulating members, a bracket for supporting said upper ends, said supporting insulating members being parallel to maintain said grid in true horizontal position during any vertical adjustment thereof.

ABRAHAM D. BLAND.
GLEN F. HOUDERSHELDT.